F. S. ANDRE.
LEAF SPRING.
APPLICATION FILED MAR. 1, 1918.
1,290,864.
Patented Jan. 14, 1919.
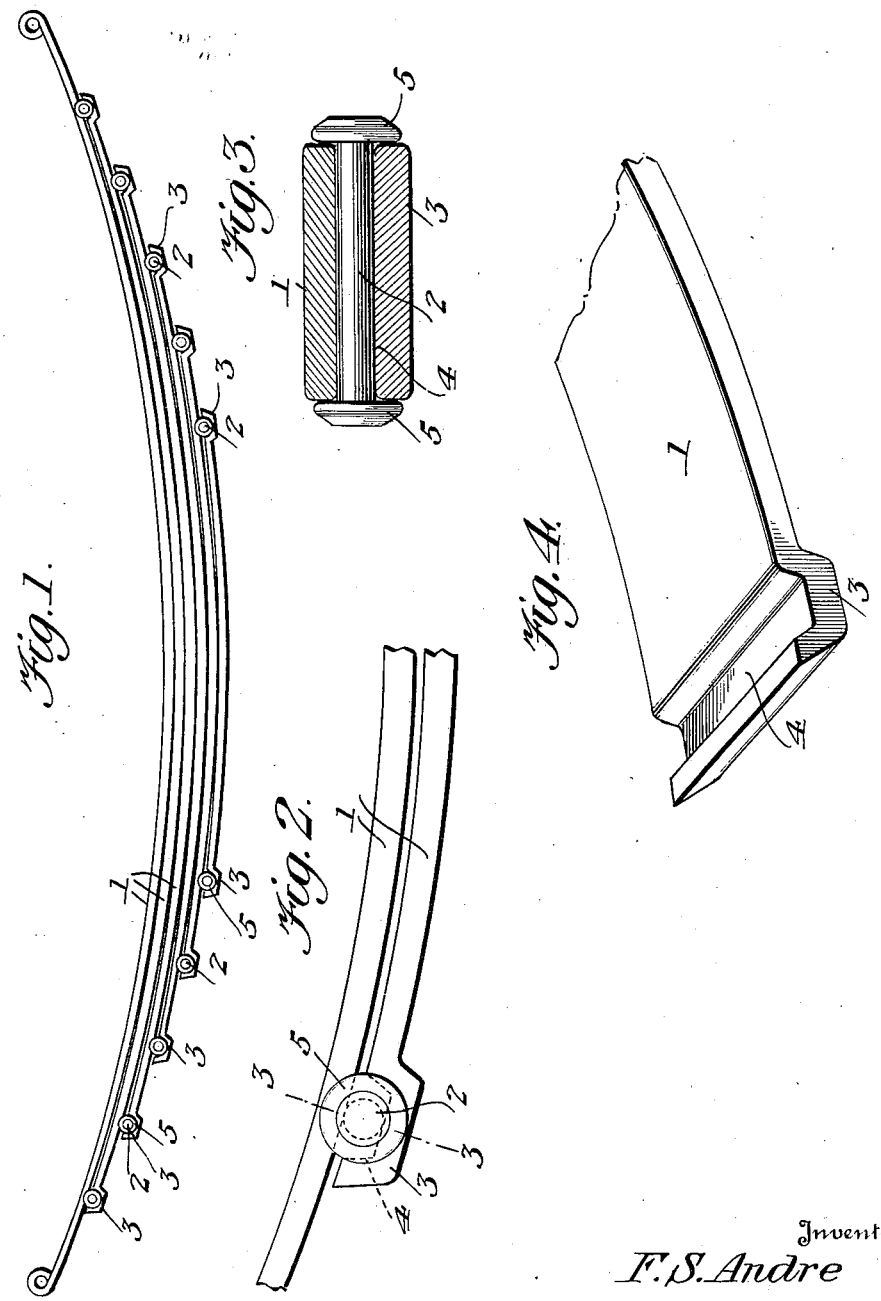
Witnesses
Inventor
F. S. Andre
By Victor J. Evans
Attorney

UNITED STATES PATENT OFFICE.

FLOYD S. ANDRE, OF MONTROSE, PENNSYLVANIA.

LEAF-SPRING.

1,290,864.

Specification of Letters Patent.  Patented Jan. 14, 1919.

Application filed March 1, 1918.  Serial No. 219,843.

*To all whom it may concern:*

Be it known that I, FLOYD S. ANDRE, a citizen of the United States, residing at Montrose, in the county of Susquehanna and State of Pennsylvania, have invented new and useful Improvements in Leaf-Springs, of which the following is a specification.

This invention relates to improvements in leaf springs such as are used on automobiles and other vehicles, the object of the invention being to provide an improved leaf spring which embodies anti-friction rollers arranged between the leaves, so that friction between the leaves is reduced to the minimum, creaking is prevented, the flexibility of the springs is increased and the necessity for the use of spring clips to connect the leaves together is avoided, the invention consisting in the construction, combination and arrangement of devices hereinafter described and claimed.

In the accompanying drawing:—

Figure 1 is an elevation of a leaf spring constructed and arranged in accordance with my invention.

Fig. 2 is a detailed elevation of the same on a larger scale.

Fig. 3 is a transverse sectional view of the same on the plane indicated by the line 3—3 of Fig. 2.

Fig. 4 is a detailed perspective view of one of the leaves showing the construction thereof with the transverse channel in which the anti-friction bearing roller is mounted.

The leaves 1 of the spring may be of any suitable size and shape and any suitable number of the leaves may be employed, according to the size and the desired strength of the spring.

In the embodiment of my invention I provide anti-friction rollers 2 which are arranged between the leaves of the springs and at the end of the leaves, as shown.

Each leaf excepting the longest is provided near its end with transverse offsets 3 and with transverse channels 4 which are formed by said offsets, the said channel of each leaf being in the side thereof which is opposed to the next adjacent leaf.

The leaves of the spring may be drop forged and formed with the offsets and channels, and may be manufactured at a very small cost.

The rollers 2 are mounted in the channels and form anti-friction bearings between the ends of the leaves and the adjacent leaves throughout the series of leaves in the spring. Each roller is provided at its end with diametrically enlarged circular heads 5, each head bearing against the side edges of two of the leaves and hence the rollers not only form anti-friction bearings between the leaves, but also by the provision of the heads 5, hold the leaves in alinement and avoid the necessity of the employment of clips for this purpose. Hence my improved spring costs practically no more than an ordinary leaf spring.

While I have herein shown and described a preferred embodiment of my invention, I would have it understood that changes may be made in the form, proportion and construction of the several parts without departing from the spirit of my invention and within the scope of the appended claim.

Having thus described my invention what I claim:—

A leaf spring comprising leaves each of which excepting the innermost is provided on the side opposed to the next adjacent leaf with offset portions at its ends and with transverse channels formed by said offset portions, and anti-friction rollers in said channels and provided with heads at their ends, said anti-friction rollers serving to hold the leaves in spaced relation and to reduce friction between the leaves and the heads of said rollers bearing against the opposite side edges of the leaves and keeping the leaves in alinement.

In testimony whereof I affix my signature.

FLOYD S. ANDRE.